United States Patent
van Voorst Vader

(10) Patent No.: US 12,213,218 B2
(45) Date of Patent: Jan. 28, 2025

(54) AUTO ADJUSTED LIGHT SOURCE

(71) Applicant: Lumileds LLC, San Jose, CA (US)

(72) Inventor: Pieter Johannes Quintus van Voorst Vader, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 234 days.

(21) Appl. No.: 17/988,578

(22) Filed: Nov. 16, 2022

(65) Prior Publication Data

US 2023/0164445 A1 May 25, 2023

Related U.S. Application Data

(60) Provisional application No. 63/281,985, filed on Nov. 22, 2021.

(51) Int. Cl.
*H05B 45/10* (2020.01)
*H04N 23/74* (2023.01)
*H05B 45/00* (2022.01)

(52) U.S. Cl.
CPC .............. *H05B 45/10* (2020.01); *H04N 23/74* (2023.01); *H05B 45/00* (2020.01)

(58) Field of Classification Search
None
See application file for complete search history.

(56) References Cited

U.S. PATENT DOCUMENTS

2021/0046861 A1    2/2021  Li et al.

FOREIGN PATENT DOCUMENTS

| CN | 110740549 A | * | 1/2020 | ............. F21V 21/15 |
| KR | 20180021487 A | * | 3/2018 | |
| KR | 102219364 B1 | | 2/2021 | |
| KR | 20210080155 A | | 6/2021 | |

OTHER PUBLICATIONS

"International Application Serial No. PCT/US2022/050128, International Search Report mailed Mar. 24, 2023", 4 pgs.
"International Application Serial No. PCT/US2022/050128, Written Opinion mailed Mar. 24, 2023", 4 pgs.

* cited by examiner

*Primary Examiner* — Anh Q Tran
(74) *Attorney, Agent, or Firm* — Schwegman, Lundberg & Woessner, P.A.

(57) ABSTRACT

A light-emitting diode (LED) array illuminates different objects in, for example, a commercial environment. A camera captures an image of each object under different lighting conditions. Feedback is used by processing circuitry for each image to determine the lighting parameters of the LED array to obtain optimum lighting conditions and the lighting parameters stored. When a new object is illuminated, the lighting parameters for the object are retrieved and used. The lighting parameters may change dependent on ambient conditions, including lighting and time of day.

19 Claims, 3 Drawing Sheets

AUTO ADJUSTED LIGHT SOURCE

PRIORITY CLAIM

This application claims the benefit of priority to U.S. Provisional Patent Application Ser. No. 63/281,985, filed Nov. 22, 2021, which is incorporated herein by reference in its entirety.

FIELD OF THE DISCLOSURE

The present disclosure relates to an adjustable illumination system.

BACKGROUND OF THE DISCLOSURE

There is ongoing effort to improve illumination systems. In particular, it is desired to provide tunable lighting in commercial and home lighting environments.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Figure 1:
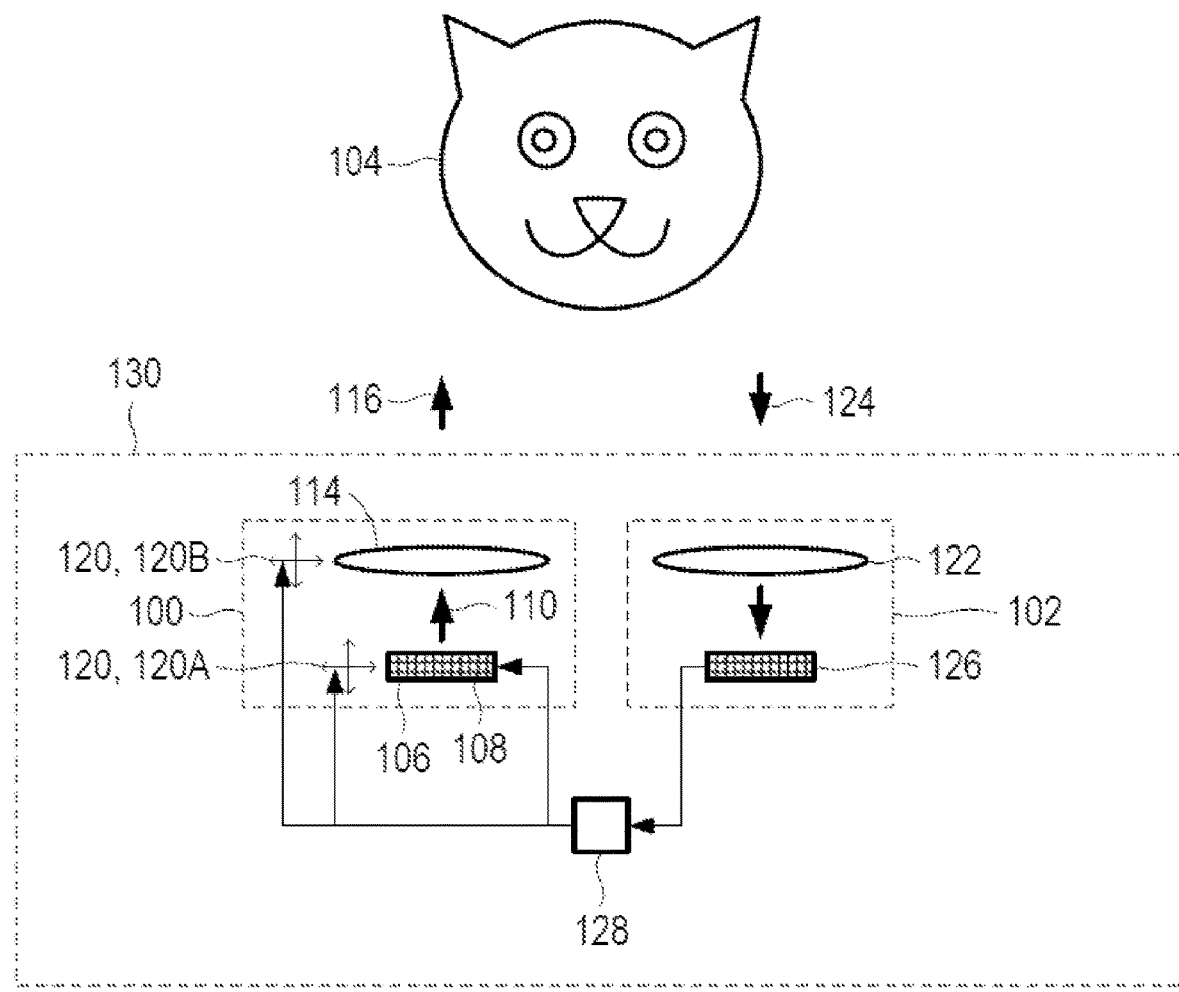
FIG. 1 shows a side view of an illumination system, in accordance with some examples.

FIG. 1 shows a side view of an illumination system, in accordance with some examples. The illumination system 100 may be disposed in an electronic device 130. The electronic device 130 may include both an illumination apparatus 104 and a camera 102. The camera 102 can capture an image of a scene 140 during an exposure duration of the camera 102.

The electronic device 130 can include a light-emitting diode (LED) array 106. The LED array 106 can include a plurality of LEDs 108 that can produce light 110 during at least the exposure duration of the camera 102. The LED array 106 may, in some embodiments, be a micro-LED array.

In embodiments in which the LED array 106 is a micro-LED array, the LED array 106 may include thousands to millions of microscopic LED pixels that can emit light and that can be individually controlled or controlled in groups of pixels (e.g., 5×5 groups of pixels). The microLEDs may be relatively small (e.g., <0.01 mm on a side) and may provide monochromatic or multi-chromatic light, typically red, green, and blue using, for example, an inorganic semiconductor material. An LED array 106 that is formed from inorganic material (e.g., binary compounds such as gallium arsenide (GaAs), ternary compounds such as aluminum gallium arsenide (AlGaAs), quaternary compounds such as indium gallium phosphide (InGaAsP), or other suitable materials) is more robust than organic LEDs, allowing use in a wider variety of environments. In addition, an LED array 106 that is formed from microLEDs may permit direct emission and can be more efficient than the conventional combination of backlight and liquid crystal display (LCD).

In some embodiments, the LED array 106 can include one or more non-emitting areas located between adjacent LEDs 108 in the LED array 106. The size of the non-emitting areas located between adjacent LEDs 108 (i.e., the distance between adjacent LEDs 108) may be significant (e.g., 5-10%) of the size of the LEDs 108 (i.e., the distance between adjacent sides of the LED 108) in the LED array 106. In some examples, one or more of the non-emitting areas can surround the LEDs 108 in the LED array 106, causing dark bands to appear in the illumination emitted by the LED array 106.

The illumination apparatus 104 can include at least one lens 114. The lens 114 can direct the light 110 toward the scene 140 as illumination 116. The illumination apparatus 104 can include an actuator 120. The actuator 120 may include individual translators 120A, 120B that can respectively translate at least one of the LED array 106 or the lens 114, or both, during the exposure duration of the camera 102 so as to blur the dark bands in the illumination 116 in the image of the scene 140. In some examples, one of the translators 120A can translate the LED array 106 with respect to the lens 114. In some examples, another of the translators 120B can translate the lens 114 with respect to the LED array 106. In some examples, the actuator 120 (a single element) can translate both the lens 114 and the LED array 106. In some examples, the lens 114 can define a longitudinal axis that extends from the LED array 106, through a center of the lens 114, to the scene 140.

In some examples, the actuator 120 or each translator 120A, 120B can be a one-dimensional actuator that can translate at least one of the LED array 106 or the lens 114 in an actuation direction that is angled with respect to the longitudinal axis. In some examples, the actuation direction can be generally orthogonal to the longitudinal axis. In some examples, the LED array 106 can be arranged in a two-dimensional pattern having a first array direction and a second array direction that is orthogonal to the first array direction. In some examples, the actuation direction can be angled with respect to the first array direction and angled with respect to the second array direction. In some examples, the LED array 106 can be arranged in a one-dimensional pattern that extends along an array direction. In some examples, the actuation direction can be non-orthogonal to the array direction. In some examples, the actuation direction can be generally parallel to the array direction. In some examples, the actuator 120 can translate at least one of the LED array 106 or the lens 114 in the actuation direction by a distance greater than or equal to a width of a non-emitting area of the one or more non-emitting areas of the LED array 106 during the exposure duration of the camera 102. In some examples, the actuator 120 can oscillate at least one of the LED array 106 or the lens 114 in the actuation direction. In some examples, the oscillation can have an oscillation period that is less than the exposure duration of the camera.

In some examples, the actuator 120 or each translator 120A, 120B can be a two-dimensional actuator that can translate at least one of the LED array 106 or the lens in an actuation plane that is angled with respect to the longitudinal axis. For example, the actuator 120 can include two movement-producing elements, with one element coupled to the LED array 106 and the other movement-producing element coupled to the lens 114. In some examples, the actuation plane can be generally orthogonal to the longitudinal axis.

The camera 102 can include a camera lens 122 that can collect reflected light 124 that is reflected from and/or emitted by the scene 140. The camera lens 122 can direct the reflected light 124 onto a multi-pixel sensor 126 to form an image of the scene 140 on the multi-pixel sensor 126. The electronic device 130 can include a controller 128 that can receive a data signal that represents the image of the scene 140. The controller 128 can optionally additionally drive the actuator 120 and/or translators 120A, 120B. The controller 128 can optionally additionally drive the LEDs 108 in the LED array 106. For example, the controller can optionally control one or more LEDs 108 in the LED array 106 independent of another one or more LEDs 108 in the LED array 106, so as to illuminate the scene in a specified manner. For example, relatively close objects in the scene 140 may require a first amount of illumination, and relatively distant objects in the scene 140 may require a second amount of illumination, greater than the first amount, to have a same brightness in the image of the scene 140. Other configurations are also possible. The camera 102 and illumination apparatus 104 can be disposed in a housing that contains the electronic device 130.

Figure 2:
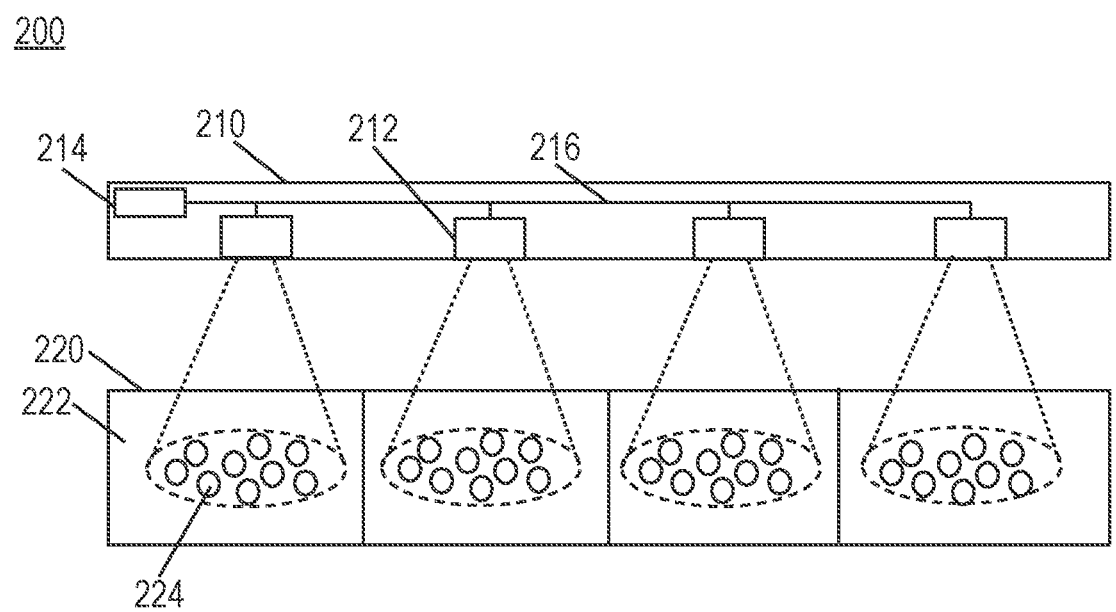
FIG. 2 shows a view of an illumination arrangement, in accordance with some examples.

FIG. 2 shows a view of an illumination arrangement 200, in accordance with some examples. The illumination arrangement 200 may be disposed, for example, in a commercial environment such as a grocery store. The illumination arrangement 200 may include both an illumination apparatus 210 and an illuminated area 220.

The illumination apparatus 210 may be contained within a single housing or may have multiple individual components that are separable. The illumination apparatus 210 may have multiple individual illumination units 212, which in some embodiments may be disposed at regular intervals within the housing. In some embodiments, the positions of the individual illumination units 212 may be adjusted within the housing to be disposed as desired in regular or irregular intervals within the housing. Each illumination unit 212 may include some or all of the components of the electronic device 130 shown in FIG. 1 or, for example, may include electronic device 130 without the camera 102.

The illumination units 212 may be controlled in some embodiments by a single control unit 214, as shown in FIG. 2. The control unit 214 may include one or more processors, memories, and other electronic components to control illumination provided by the illumination units 212. In some embodiments, the control unit 214 may separately control illumination provided by each illumination unit 212 so that each illumination unit 212 is able to provide different intensities, colors, correlated color temperatures, values of $D_{uv}$, (which indicates the distance of a light color point from the black body curve), values of color-rendering index (CRI), etc. In embodiments in which the components of the illumination apparatus 210 are separable, the control unit 214 may be located in a primary illumination unit 212 and communicate via wireless or wired connections with secondary illumination units 212, or multiple illumination units 212 may have separate control units 214.

The control unit 214 may be connected with the illumination units 212 through wiring 216 disposed throughout the illumination apparatus 210. In other embodiments, each illumination unit 212 may contain a separate control unit 214. The control unit 214 may be, for example, include a printed circuit board with different electronic components. The control unit 214 may include a wireless and/or wired connection for communication with an external controller and an external network. The external controller may be local to the illumination arrangement 200, e.g., a handheld electronic device within the store. Alternatively, a server local to the illumination arrangement 200 (e.g., within the store) or connected to the illumination apparatus 210 through the external network may be used to provide control signals to the control unit 214.

Each of the illumination units 212 may illuminate items 224 in a different section 222 of the illuminated area 220. The items 224 may be, for example, food items. As above, a mixture of LEDs of different colors may be used for many lighting applications to provide a tunable color temperature and/or light distribution. For instance, spotlighting may be used for shop lighting in some instances to highlight a single object (or set of objects), as shown in FIG. 2, while in other instances displaying a broader collection of objects may involves more diffuse lighting. Color, similarly, can be used to discriminate between objects. For example, color can also be used to highlight certain features, for instance for food lighting different color mixes may be used to highlight the freshness and quality of certain foods. However, the objects being displayed may be changed regularly, as may positioning of the displays and the ambient lighting conditions, causing the optimum illumination (lighting/optics positioning, intensity, dispersion, and color, among others) to accordingly change. Accordingly, it may be difficult to continually optimize the lighting conditions provided by the illumination apparatus 210.

In some embodiments, the camera 102 shown in FIG. 1 (or, in FIG. 2 if present) may be used to capture the object(s) to be illuminated and adjust the illumination using stored information related to the same or similar objects and/or local and/or remote user feedback. In some embodiments, artificial intelligence (AI) and/or machine learning (ML) may be used to generate the conditions for providing the illumination. A transmitter may be used to send the image of the object(s) being illuminated to a remote processing device, such as the server 150 shown in FIG. 1, located in a different geographic area (e.g., city) than the illumination apparatus, or may be provided in a distributed (cloud) network. The image may be communicated to the external processing device via a local network, such as WiFi, or a remote network such as a $5^{th}$ generation (5G) network or some other network. The external processing device may use object recognition via the AI/ML, model to suggest or remotely set the optimal illumination for the object(s). The AI/ML, model and storage may be disposed, for example, in the server 150.

Figure 3:
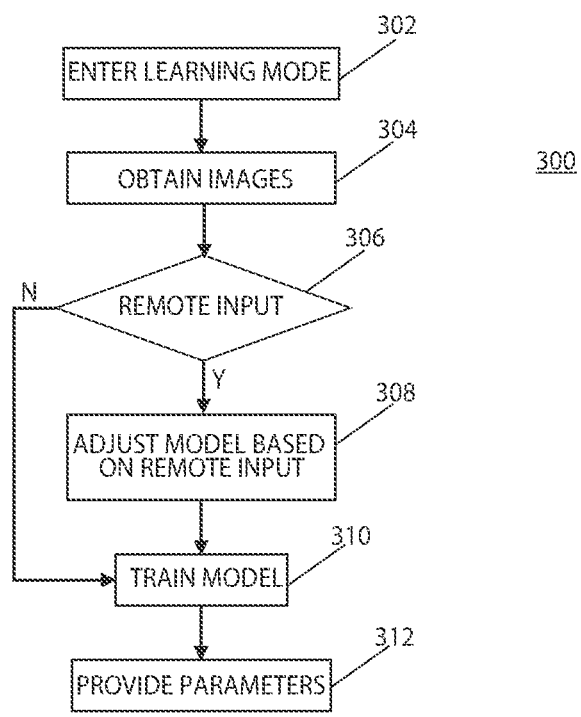
FIG. 3 illustrates a block diagram for lighting training in accordance with some embodiments.

FIG. 3 illustrates a block diagram for lighting training in accordance with some embodiments. Note that only some operations are shown, other operations may be present but are not shown for convenience. The external processing device may have a learning mode in which the lighting conditions are trained. The method 300 illustrates training an AI/ML model, although other algorithms may be used, in which after the AI/ML model enters learning mode at operation 302, one or more images may be obtained at operation 304 by the external processing device. In some cases, the training may be initiated when the image is obtained (e.g., captured by the camera 102 and transmitted over the network to the external processing device), or operated at predetermined intervals in which images of the objects are batched when not in learning mode.

At operation 306, the external processing device may determine whether a remote input (or multiple remote inputs) to grade a particular image has been provided. In some instances, users (e.g., shoppers) at the location where the image was captured may be able to provide feedback regarding the illumination conditions at the time of image capture (of the particular image). The local users (e.g., customers) may be able to provide feedback using a feedback mechanism, such as an input disposed on the illumination apparatus or a dedicated application on their smartphones or other electronic devices, for example. The feedback mechanism may enable feedback for a variety of parameters such as color and intensity, $D_{uv}$, and CRI. The feedback may be used by the enterprise to provide benefits to the user, such as allowing the user to unlock applications on the illumination apparatus and/or the user device, providing access to WiFi, and/or providing video, or audio for a predetermined amount of time (e.g., which may be based on the amount of feedback) among others.

In some embodiments, the user may be able to adjust the lighting of the image prior to capture and provide feedback for the new image (in addition to or instead of the original image). In this case, a security mechanism may be used to avoid malicious manipulation of the lighting conditions (e.g., repeated entries within a relatively short amount of time, such as under 10 seconds). The security mechanism may be, for example, included with the feedback mechanism such as an activator (e.g., button) that has a mechanical reset and/or an electronic lockout that is relatively slow (e.g., 5-10 seconds).

In other embodiments, the user input may be initial training provided by initial training users (non-customers) at a central (control) location distal to the illumination apparatus (e.g., where the server is located) or local to the illumination apparatus. In some embodiments, the user input may be limited to the initial training users, and subsequent training may be performed automatically, without user input until triggered by an event such as automated detection of a change in the type of object being illuminated (though object recognition by the trained AL/ML, model) or based on manual intervention/triggering local to the illumination apparatus.

Alternatively, or in addition, the images (or limited number of variations under sufficiently different conditions as determined by the variable being changed, for example) of the objects illuminated by the illumination apparatus may be posted online to be available generally for feedback. In one example, the images may be posted to Facebook®, and/or one or more other social media platforms; the user input may include a number of responses (e.g., likes/dislikes, rating scale of 1-10) specific to the lighting conditions in the social media platform. In some embodiments, a batch of images illuminating the same object under different lighting conditions may be displayed at the same time and the responses relative to each image or a base set image. In some embodiments, additional benefits such as coupons or rebates on the illuminated objects (or other items for sale in the store) may be provided to the user to encourage participation online. The images and lighting preferences may be used to train the AI/ML, model for the particular objects being illuminated under the specific conditions. In other embodiments, other types of inputs may be used to train the AI/ML, model, such as sales figures associated with the objects being illuminated under the lighting conditions used. The sales figures may, for example, be normalized to the particular store, time of day/week/month/year, environmental conditions (e.g., temperature, humidity, weather), etc.

In response to user feedback being provided (and accepted), at operation 308, the parameters of the AI/ML model may be adjusted to incorporate the user feedback. Independent of whether or not user feedback is provided, the AI/ML, model is trained at operation 310. During training, a supervised, unsupervised or reinforcement learning mode may be used. In supervised learning mode, the AI/ML, model being trained may learn a mapping between input examples (e.g., object being illuminated) and the target variables (e.g., color, driving for each LED [such as current/voltage/pulse width modulation (PWM) duty cycle], environmental conditions, object position within the image). In some embodiments, the supervised learning problem involves classification, e.g., the object being illuminated, as well as regression to determine the numeric outputs for the various target variables. The supervised algorithm may learn by making predictions given examples of input data. In this case, the AI/ML model is supervised and corrected via an algorithm to better predict the expected target outputs in the training dataset. In some embodiments, a decision tree may be used to make the determinations, for example, of the type of object to be illuminated. In some embodiments, an artificial neural network (ANN) may be used to provide both classification and the numeric outputs. Thus, as above, an option may be provided in the learning mode to adjust various illumination settings of the object to be illuminated for training purposes.

In learning mode, the lighting provided by the illumination units 212 may be adjusted automatically using the target variables. That is, a local controller of the illumination apparatus may provide control signals to control the variables of the LEDs providing the illumination of the objects. In particular, one or more of the target variables may be adjusted by a predetermined amount (dependent on the target variable) and an image captured by a camera, such as that described above. The image may then be supplied to the AI/ML model for classification and/or image determination, as well as optimal illumination condition determination.

Typical machine learning techniques require thousands or millions of images to accurately train a model. All of the images taken by the illumination apparatus or from existing images (from alternate sources such as online images) may be used to train the AI/ML model, or a subset of images may be selected from a larger set of available images. In the latter case, in some embodiments, images may be selected for their particular qualities. For example, the selected images may be determined by the AI/ML model to be in good focus across the entire image, specific to one product or a predetermined set of products, and not include other interactions (such as misting in a grocery store or a human hand or other interaction in the frame). Images, or portions of images, may be excluded from the training in accordance with the limitations set by the training algorithm. The selected images may be of any subject matter or type when the above conditions are met. For specific applications, images from similar scene content may be sourced, but others may be used. The images may be of any size and the algorithm may automatically adjust to differing image sizes.

This training may thus be performed for each image or for each object, for example. At operation 312, based on a matrix of images vs. target variables, the AI/ML model may determine the final output parameters for illumination of the objects under the environmental conditions (e.g., ambient light). These final output parameters may be illumination settings that are sent to the illumination apparatus 210 to be automatically used, or may be suggested settings that are stored for local control using a remote control. The illumination settings may then be recalled by the local controller to optimize the illumination profile for the situation. The lighting provided by the illumination units 212 may be individually adjusted or may be adjusted in groups that have the same conditions (e.g., illuminate the same objects).

In some embodiments, the images may be taken by the illumination apparatus in response to an event occurring and the lighting adjusted based thereon. The event may be, for example, the elapse of a timer from the last image having been taken (thus, the image may be taken at predetermined intervals), which may be adjusted based on the environment. For example, taking the image and adjusting the lighting may be deactivated at predetermined times, such as after store hours. Alternatively, or in addition, the event may be a manual trigger, for example, to reinitiate lighting conditions whenever the display changes due to the type of object being changed.

As above, each of the illumination units 212 may have multiple LEDs or groups of LEDs that may be independently controllable based on the AI/ML training to provide the trained illumination. Thus, the AL/ML training may be used to adjust each of the illumination units 212 independently. Accordingly, not only can the illumination conditions be controlled, but also a pattern of illumination provided by each of the illumination units 212 may be controlled.

In other embodiments, a general algorithm may be used to determine the desired illumination parameters rather than using an AI/ML model. In such an embodiment, initial user input may be used during training to set the lighting parameters and the lighting parameters automatically adjusted after a predetermined amount of time to a new combination of lighting parameters to provide the illumination. The new settings may be based on the user feedback described above and/or may be randomly set to between already predetermined or highly rated (by users) settings to narrow down the final parameter settings to obtain further user input. Once determined and out of learning/training mode, similar to the AI/ML model, the parameter settings may be static or may be varied dynamically, e.g., as a function of the time of day, as indicated by the parameter settings. Thus, both the tunable color temperature and light distribution (including either LEDs/LED arrays activated or optics/lenses changed), among others, of the illumination may be tailored to the object being illuminated.

The processor may be connected to a storage device that includes a non-transitory machine readable medium (hereinafter simply referred to as machine readable medium) on which is stored one or more sets of data structures or instructions (e.g., software) embodying or utilized by any one or more of the techniques or functions described herein. While the machine readable medium may be a single medium, the term "machine readable medium" may include a single medium or multiple media (e.g., a centralized or distributed database, and/or associated caches and servers) configured to store the one or more instructions.

The term "machine readable medium" may include any medium that is capable of storing, encoding, or carrying instructions for execution by the processor that cause the processor to perform any one or more of the techniques herein, or that is capable of storing, encoding or carrying data structures used by or associated with such instructions. Non-limiting machine readable medium examples may include solid-state memories, and optical and magnetic media.

Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. The instructions may further be transmitted or received over a communications network using a transmission medium via a network interface device utilizing any one of a number of wireless local area network (WLAN) transfer protocols.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

What is claimed is:

1. An illumination apparatus comprising:
   a plurality of sections, each section comprising:
      an associated light-emitting diode (LED) array including a plurality of LEDs configured to emit light to illuminate a unique area in a commercial environment; and
      an associated camera configured to capture an image of the unique area illuminated by the associated LED array; and
   a controller configured to control at least one of the associated LED arrays to emit the light using final lighting conditions, the controller comprising a memory to store the final lighting conditions, the final lighting conditions based on a model trained using:
      images of an area, illuminated by the at least one of the associated LED arrays, captured under different lighting conditions, and
      feedback of the area captured under each of the different lighting conditions.

2. The illumination apparatus of claim 1, wherein the model is an artificial intelligence/machine learning (AI/ML) model that uses an artificial neural network (ANN) to determine lighting parameters of each of the associated LED arrays to provide the final lighting conditions.

3. The illumination apparatus of claim 1, wherein lighting parameters to generate the different lighting conditions are dependent on an object illuminated by a first of the associated LED arrays, different objects illuminated by the first of the associated LED arrays having different lighting parameters.

4. The illumination apparatus of claim 1, wherein lighting parameters to generate the different lighting conditions comprise color temperature, current to drive the LEDs in a first of the associated LED arrays and lighting distribution provided by the first of the associated LED arrays.

5. The illumination apparatus of claim 1, further comprising a transmitter configured to communicate with remote processing circuitry, the controller configured to transmit the image to the remote processing circuitry and receive, from the remote processing circuitry, final lighting parameters for a first of the associated LED arrays to emit the light using the final lighting conditions.

6. The illumination apparatus of claim 1, wherein:
   the images are posted to a social media platform, and
   the feedback comprises a number of positive responses in the social media platform.

7. The illumination apparatus of claim 1, wherein the feedback comprises feedback received from a device local to the area.

8. The illumination apparatus of claim 7, wherein the device comprises an input disposed on the illumination apparatus.

9. The illumination apparatus of claim 7, wherein the device comprises an app on a user smartphone.

10. The illumination apparatus of claim 1, wherein the feedback comprises normalized sales figures associated with objects illuminated under the different lighting conditions.

11. The illumination apparatus of claim 1, further comprising a plurality of controllers, at least two LED arrays of the associated LED arrays controlled by different controllers of the plurality of controllers.

12. The illumination apparatus of claim 1, wherein each of the associated LED arrays is controlled the controller.

13. The illumination apparatus of claim 1, wherein the final lighting conditions are static.

14. The illumination apparatus of claim 1, wherein the final lighting conditions are dynamic and depend on at least one parameter including parameters of ambient lighting and time of day.

15. An illumination system comprising:
an illumination apparatus comprising:
    a control system that includes a memory configured to store final lighting conditions, and
    a plurality of sections, each section comprising:
        a light-emitting diode (LED) array including a plurality of LEDs configured to emit light to illuminate an area in a commercial environment, and
        a camera configured to capture an image of the area illuminated by the LED array,
    each section configured to illuminate a different area and capture images of the different area,
    the control system configured to control the LED array of each section independently to emit the light using the final lighting conditions based on the images associated with the section; and
processing circuitry configured to determine lighting parameters for the final lighting conditions for each section based on:
    images of the area captured under different lighting conditions, and
    feedback of the area captured under each of the different lighting conditions.

16. The illumination system of claim 15, wherein:
the lighting parameters in each section are dependent on an object illuminated by the LED array in the section, different objects illuminated by the LED array in the section have different lighting parameters, and
a same object illuminated by the LED array in different sections have independently-determined lighting parameters.

17. The illumination system of claim 15, wherein the control system is further configured to:
post the images for each section to a social media platform, and
collect responses to the images posted in the social media platform as the feedback, each response indicating a reaction to the lighting conditions for the image.

18. An illumination method comprising:
capturing images of each of a plurality of objects in a commercial environment under different lighting conditions provided by a light-emitting diode (LED) array among a plurality of LED arrays, each of the plurality of LED arrays in different sections of an illumination apparatus and configured to illuminate a unique area of the commercial environment whose associated images are captured by a camera in the section;
determining parameters for the LED array for each of the lighting conditions;
obtaining feedback for each of the images;
selecting final parameters for illumination of each of the objects based on the feedback;
capturing an image of a particular object illuminated by the LED array using a default setting; and
adjusting illumination of the particular object to use the final parameters.

19. The method of claim 18, wherein obtaining feedback for each image comprises posting the image to a social media platform and collecting responses indicating a reaction to the lighting conditions used for the image.

* * * * *